US011830233B2

(12) United States Patent
Lee et al.

(10) Patent No.: US 11,830,233 B2
(45) Date of Patent: *Nov. 28, 2023

(54) SYSTEMS AND METHODS FOR STAMP DETECTION AND CLASSIFICATION

(71) Applicant: Nationstar Mortgage LLC

(72) Inventors: Won Lee, Irving, TX (US); Goutam Venkatesh, Irving, TX (US); Ankit Kumar Sinha, Irving, TX (US); Sudhir Sundararam, Irving, TX (US)

(73) Assignee: Nationstar Mortgage LLC, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,317

(22) Filed: Jun. 2, 2022

(65) Prior Publication Data
US 2022/0292803 A1      Sep. 15, 2022

Related U.S. Application Data

(63) Continuation of application No. 16/990,892, filed on Aug. 11, 2020, now Pat. No. 11,361,528.

(51) Int. Cl.
*G06V 10/25*     (2022.01)
*G06N 20/20*     (2019.01)
(Continued)

(52) U.S. Cl.
CPC .............. *G06V 10/25* (2022.01); *G06F 18/24* (2023.01); *G06N 3/08* (2013.01); *G06N 20/20* (2019.01); *G06V 30/153* (2022.01); *G06V 30/10* (2022.01)

(58) Field of Classification Search
CPC .... G06V 30/10; G06V 30/153; G06V 30/413; G06V 10/25; G06V 10/40; G06V 10/764; G06N 3/08; G06N 20/20; G06F 18/24
See application file for complete search history.

(56) References Cited

U.S. PATENT DOCUMENTS

| 6,738,517 B2 | 5/2004 | Loce et al. |
| 10,354,134 B1 | 7/2019 | Becker et al. |

(Continued)

FOREIGN PATENT DOCUMENTS

EP       3 024 213      *   5/2016

OTHER PUBLICATIONS

Latyshev, et al. (computer English Translation of Russian Patent No. RU 2 702 967 C1), pp. 1-11. (Year: 2019).
(Continued)

*Primary Examiner* — Daniel G Mariam
(74) *Attorney, Agent, or Firm* — Daniel E. Rose; Volpe Koenig

(57) ABSTRACT

In some aspects, the disclosure is directed to methods and systems for detection and classification of stamps in documents. The system can receive image data and textual data of a document. The system can pre-process and filter that data, and covert the textual data to a term frequency inverse document frequency (TF-IDF) vector. The system can detect the presence of a stamp on the document. The system can extract a subset of the image data including the stamp. The system can extract text from the subset of the image data. The system can classify the stamp using the extracted text, the image data, and the TF-IDF vector. The system can store the classification in a database.

18 Claims, 6 Drawing Sheets

(51) Int. Cl.
*G06N 3/08* (2023.01)
*G06V 30/148* (2022.01)
*G06F 18/24* (2023.01)
*G06V 30/10* (2022.01)

(56) References Cited

U.S. PATENT DOCUMENTS

| | | |
|---|---|---|
| 2009/0092320 A1 | 4/2009 | Berard et al. |
| 2010/0230493 A1* | 9/2010 | Akiyama ............... G06K 7/14 |
| | | 235/437 |
| 2014/0072219 A1 | 3/2014 | Tian |
| 2016/0147386 A1 | 5/2016 | Han et al. |
| 2017/0206409 A1* | 7/2017 | Bataller ............... G06V 30/412 |
| 2020/0074169 A1 | 3/2020 | Mukhopadhyay et al. |
| 2020/0099530 A1 | 3/2020 | Khatib et al. |
| 2020/0274990 A1 | 8/2020 | Berfanger et al. |

OTHER PUBLICATIONS

Non-Final Office Action for U.S. Appl. No. 16/990,900 dated Aug. 11, 2021 (13 pages).
Notice of Allowance on U.S. Appl. No. 16/990,892 dated Apr. 20, 2022.
U.S. Office Action on U.S. Appl. No. 16/990,892 dated Feb. 14, 2022.

* cited by examiner

SYSTEMS AND METHODS FOR STAMP DETECTION AND CLASSIFICATION

RELATED APPLICATIONS

The present application claims the benefit of and priority as a continuation to U.S. patent application Ser. No. 16/990,892, entitled "Systems and Methods for Stamp Detection and Classification," filed Aug. 11, 2020, the entirety of which is incorporated by reference herein.

FIELD OF THE DISCLOSURE

This disclosure generally relates to systems and methods for computer vision and image classification. In particular, this disclosure relates to systems and methods for identifying, extracting, and classifying stamps or other regions of interest from in document images.

BACKGROUND OF THE DISCLOSURE

Classification of documents is challenging because of a lack of standardization across document formats. Printed documents can include text, images, and other markings that present challenges to accurate classification. Identifying and classifying stamps on printed documents is particularly challenging because of the irregularities between stamp types, positions in documents, and inconsistent impressions or markings of the stamp impressed on the document. It would be beneficial for many document classification systems to automatically identify, extract, and classify stamps included in images of printed documents.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
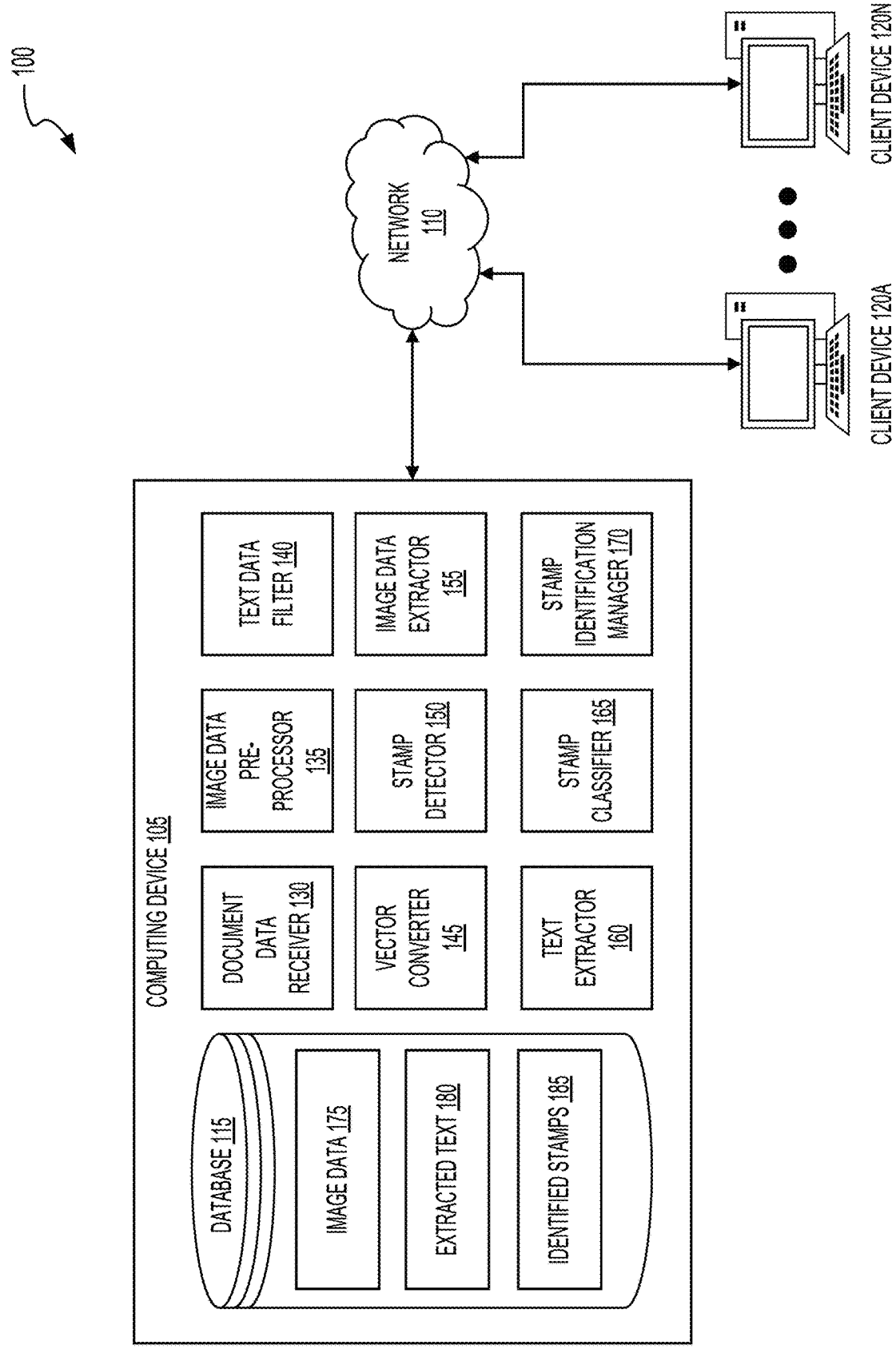
FIG. 1 shows a block diagram of an example system for detecting and classifying stamps or regions of interest in document images.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for stamp detection and classification; and Section B describes a computing environment which may be useful for practicing embodiments described herein.

A. Stamp Detection and Classification

Printed documents can include text, images, and other information that can be challenging to classify using document analysis techniques. Certain markings, such as stamps, signatures, or other modifications to documents that occur after a document is printed can present additional challenges to document classification. Often, stamps can be inconsistent with the rest of a document, and may be partially incomplete, irregular, and have a varying location across similar documents. Because stamps and other markings are typically applied after a document is printed, those markings can occasionally overlap and obscure document text and the stamp itself. Further, the placement of markings such as stamps and signatures may vary in shade, color, and marking strength.

Other document classification schemes utilize simple feature extraction techniques that involve identifying low-level image features such as lines, shapes, and patterns using digital image techniques in order to attempt to detect and classify stamps. However, such implementations suffer from a lack of consistent accuracy across a variety of stamp and marking types, and also often fail to classify stamps that include additional text information. Further, such techniques cannot effectively extract stamps that are present in complex documents that include a variety of text, images, and stamp types. Often, stamps or other markings can include text information that the other implementations fail to extract or analyze effectively. Certain stamps or markings make lack any significant shape, and may include only text that other models fail to identify, extract, or classify.

To address the foregoing issues, the systems and methods of this technical solution can automatically detect, extract, and classify stamps and other regions of interest in document images by combining natural language processing techniques and image processing techniques. The document images can include images of printed documents that may be with stamped, for example, with one or more ink or toner stamps. The systems and methods described herein can implement cloud computing, machine learning, and domain-specific data preprocessing techniques to detect a variety of different stamp or marking types in document images by analyzing its textual content and its visual structure. This allows the systems and methods of this technical solution to proficiently identify, classify, and extract stamps or markings of interest, even if those stamps or markings lack identifying shapes and are instead predominantly text.

This technical solution provides a technical improvement to document, stamp, and marking classification systems by improving the accuracy of stamp and marking extraction and classification. The systems and methods described herein can implement cloud computing, machine learning, and domain-specific data processing techniques to effectively extract and classify stamps in document images that other document classifiers cannot. The techniques described herein can pre-process and filter un-necessary data from a document image, and utilize combined outputs of image data and text data analysis techniques to detect and extract stamps or other markings from document images. In particular, the pipeline architecture techniques described herein can accurately classify stamps that vary in shape, position, and structure by combining natural language processing techniques and image data processing techniques. The systems and methods described herein can re-train and adapt to unfamiliar stamp or marking types and patterns on demand. Feature extractors for those stamp types can be implemented automatically and without manual intervention.

The systems and methods described herein can analyze document images, for example, on a page-by-page basis to identify or detect markings such as stamps. The systems can then extract the stamps detected on a document, and perform classification processed on the extracted to stamps. Stamps or other markings can be classified, for example, to differentiate between different stamp types. Stamp types may include, for example, a signature, an identifying marking applied to a document after printing, a court stamp, a notary stamp, a mortgage recording stamp, an endorsement stamp, an identifying seal applied to a document after printing, a signature, or any other type of marking applied to a document after printing. To increase classification accuracy, the systems and methods described herein can analyze further analyze the portions of the document image that may not include the stamp to extract as much relevant information from a given document image as possible.

Based on the information extracted from the stamp and the document image, the systems and methods described herein can further apply additional document classification techniques to identify or classify the type of the document under analysis. Other document data can then be extracted or inferred based on the information extracted from the document, the stamp, and the classification of the document. After extraction, this other document data can be stored in association with the document and the document classification in a data store. The machine learning techniques used to extract image data can include, for example, convolutional neural networks, residual neural networks, or other neural networks or image classifier models. In conjunction with image classification, the systems and methods described herein can implement natural language processing models, word-embedding, and bags-of-words techniques to analyze information about text present in document images.

The techniques of this technical solution can implement one or more pipeline architectures, allowing for the sequential or parallel processing of document images. The architectures of this technical solution can retrieve or receive document images or files, and can separate the files or images by type. A file or image type can be analyzed, for example, by parsing information from a header memory region of the file, or by analyzing a file extension present in the file name. The architecture can pre-process the images by converting them to grayscale, and can reduce them to a predetermined dimension for further analysis (e.g., 512× 512, 1024×1024, 2048×2048, or any other dimensions to match the input of a classification model as needed, etc.).

Text can be pre-processed and extracted or filtered from a document image using a regular expression algorithm. Cleaning, extracting, or filtering the text from a document, can improve the detection of stamps or other markings in further classification steps. To further aid in stamp detection, the extracted text information can be packaged into a data structure suitable for machine learning models, for example the text and other document information can be vectorized into a term frequency—inverse document frequency (TF-IDF) vector. Using a weighted ensemble model, the TF-IDF vector, along with text and image data, can be used to detect the presence of a stamp or other marking of interest in the document image.

Upon detection of one or more stamps or markings of interest in a document image, the document can then be processed using an object classification model, such as a deep convolutional neural network (CNN). Additional processing techniques, such as optical character recognition (OCR), can be applied to the portion of the document including the stamp or mark of interest to extract additional text information of each stamp or mark detected in the document image. Natural language processing (NLP) models, such as rule-based or statistical NLP models, can be used to analyze the text information present in each stamp to aid in accurate classification of the stamp or marking.

The ensemble of models utilized by the systems and methods of this technical solution can process both text and images to detect and classify one or more stamps or markings that may be present in document images. Text and image analysis is used because the stamps or markings present in document images often contain relevant identifying text in addition to identifying geometric and layout information. By synthesizing the output of text and image analysis models, the systems and methods described herein can more accurately classify and analyze stamps or markings present on printed documents.

The image classification models of the ensemble can include CNNs, deep neural networks (DNN), fully connected neural networks, autoencoder networks, dense neural networks, linear regression models, rule-based techniques, and other machine learning techniques usable to identify objects in images. In some implementations, at least one image based model can include a CNN coupled with an autoencoder model with a dense neural network appended to the end. In some implementations, one other model includes a convolutional autoencoder model that can function as form of unsupervised transfer learning. The autoencoder can be fed into a dense neural network (e.g., a fully connected neural network, etc.) that acts as a classifier based on the features extracted in the autoencoder.

Language and text processing models of the ensemble can include dense neural networks, and domain-specific processing to pre-process and extract text and language information from document image files. Such domain-specific processing techniques can include regular-expression algorithms that can clean the text extracted or filtered from the image. Domain-specific word standardization techniques can be applied to the text information to increase the accuracy and performance while decreasing the dimensionality of the data input to the classification models. Certain stamps may include regular language or text that may be processed or analyzed using rule-based detection and parsing, such as processing using regular expressions. Such complex regular expression rules can help organize the text into distinguishable bigrams that are associated with recording stamps used in mortgage documents, particularly the smaller recording stamps that solely display the book and page of the associated county records. This process allows the text-based models to better isolate the language associated with recording stamps through the creation of unique, stamp-specific bigrams or keyword pairings. Text of particular interest, such as keywords, numbers, or patterns, can be converted into standardized features to allow the classification models to better identify and classify the stamps or markings. When standardized, they can be paired together into bigrams that distinguishes the block of text that are derived from stamps efficiently. Such text processing can reduce the overall size of data input into a classification model, reduce overall computational complexity, and create distinguishing word features that makes it more efficient to detect a recorded stamp on a page, which is an improvement over other document classification systems.

Using meta-learning techniques such as ensembling, the foregoing models can be computed into a single ensemble classifier, or detector model. Weights can be applied to one or more of the models described herein, for example through Tikhonov regularization or ridge regression, to perform weighted ensembling when creating the single ensemble classifier. The ensemble classifier can be further optimized or fit onto one or more test sets (e.g., sets of document data or set of stamps to classify) by the systems and methods described herein using the statistical distribution of one or more test sets. This can allow the weighted ensemble classifier to become further optimized for a population of stamps, markings, or document types. Multicollinearity issues are therefore mitigated between each model by using ridge regression techniques, thus improving the efficiency in parameter estimation in used for creating a final output. Cross-validation techniques can be used to find an optimal $\lambda$ value, allowing the ensemble model to filter out any unnecessary components. As such, the systems and methods described herein can utilize the ensemble model to detect, extract, and classify stamps or markings of interest in one or more document images or files.

In some implementations, the systems and methods of this technical solution can implement a CNN model as an automated feature extractor for stacked bidirectional long short-term memory (LSTM) based models or stacked gated recurrent unit (GRU) based models. The systems and methods of this technical solution can segment or break down a document image into various regions, allowing for faster and more compact image and document analysis. By breaking documents down into segments, the systems and methods described herein can implement parallel processing techniques to improve the computational efficiency of stamp or making detection, extraction, and classification. Regional segmentation of document images or files can reduce the noise and dimensions that a particular model will process, improving the overall classification accuracy of the system.

The systems and methods described herein can implement other specialized classification models for different regions of document images. For example, certain classification models may be trained as specialized for the edges of document images, where smaller stamps or markings may be found. The models can be trained to learn features of stamps that are typically found in those edge regions, which can improve the accuracy and proficiency of the stamp or marking classification process. In some implementations, a hierarchy ensemble model may be implemented to determine whether a document image or file should be processed by an NLP model, an image processing model, or both. The hierarchy ensemble model can determine the models with which a document image or file should be processed based on document quality (e.g., clarity of document image, light of document image, clarity or discernibility of one or more features in document image, resolution of document image, etc.), data returned from OCR processing, or other characteristics of the document.

Referring now to FIG. 1, depicted is an example system 100 for detecting and classifying stamps, markings, patterns, or other regions of interest in document images. The system 100 can include at least one computing device 105, at least one network 110, and at least one client devices 120A-N (sometimes referred to generally as "client device 120" or "client devices 120"). The computing device 105 can include at least one database 115, at least one document data receiver 130, at least one image data pre-processor 135, at least one text data filter 140, at least one vector converter 145, at least one stamp detector 150, at least one image data extractor 155, at least one text extractor 160, at least one stamp classifier 165, and at least one stamp identification manager 170. The database 115 can store, maintain, index, or otherwise include at least one image data 175, at least one extracted text 180, and at least one or more identified stamps 185 (sometimes referred to in the singular as identified stamp 185).

Each of the components or modules (e.g., the computing device 105, the network 110, the client devices 120, the database 115, the document data receiver 130, the image data pre-processor 135, the text data filter 140, the vector converter 145, the stamp detector 150, the image data extractor 155, the text extractor 160, the stamp classifier 165, and the stamp identification manager 170, etc.) of the system 100 can be implemented using the hardware components or a combination of software with the hardware components of any computing system (e.g., computing device 500, the computing device 105, any other computing system described herein, etc.) detailed herein.

The computing device 105 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The processor may include specialized processing units for parallel processing, such as one or more tensor processing units (TPU) or one or more graphical processing units (GPU). The processor may include one or more co-processors, such as a floating point unit (FPU), vector processing unit (VPU), or other specialized processor configured to work in conjunction with one or more central processing units. The memory may include, but is not limited to, electronic, optical, magnetic, or any other storage or transmission device capable of providing the processor with program instructions. The memory may be configured to allow for high communication bandwidth between parallel processing units of the processor. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The computing device 105 can include one or more computing devices or servers that can perform various functions as described herein. The computing device 105 can include any or all of the components and perform any or all of the functions of the computer device 500 described herein in conjunction with FIG. 5.

The network 110 can include computer networks such as the Internet, local, wide, metro or other area networks, intranets, satellite networks, other computer networks such as voice or data mobile phone communication networks, and combinations thereof. The computing device 105 of the system 100 can communicate (e.g., bidirectional communication) via the network 110, for instance with at least one client device 120. The network 110 may be any form of computer network that can relay information between the computing device 105, the client device 120, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. Any or all of the computing devices described herein (e.g., the computing device 105, the computer system 500, etc.) may communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the computing device 105, the computer system 500, etc.) may also communicate wirelessly with the computing devices of the network 110 via a proxy device (e.g., a router, network switch, or gateway).

The database 115 can be a database or data storage medium configured to store and/or maintain any of the information described herein. The database 115 can maintain one or more data structures, which may contain, index, or otherwise store each of the values, pluralities, sets, variables, vectors, or thresholds described herein. The database 115 can be accessed using one or more memory addresses, index values, or identifiers of any item, structure, or region maintained in the database 115. The database 115 can be accessed by the components of the computing device 105, or any other computing device described herein, via the network 110. In some implementations, the database 115 can be internal to the computing device 105. In some implementations, the database 115 can exist external to the computing device 105, and may be accessed via the network 110. The database 115 can be distributed across many different computer systems or storage elements, and may be accessed via the network 110 or a suitable computer bus interface. The computing device 105 can store, in one or more regions of the memory of the computing device 105, or in the database 115, the results of any or all computations, determinations, selections, identifications, generations, constructions, or calculations in one or more data structures indexed or identified with appropriate values. Any or all values stored in the database 115 may be accessed by any computing device described herein, such as the computing device 105 or the computing device 500, to perform any of the functionalities or functions described herein.

The client device 120 can be a computing device configured to communicate via the network 110 to display data such as applications, web browsers, webpage content or other information resources. The client device 120 can transmit requests for stamp detection and classification to the computing device 105 via the network 110. The request can include, for example, an image of a document, such as an image captured by the client device 120. The client devices 120 can be one or more desktop computers, laptop computers, tablet computers, smartphones, personal digital assistants, mobile devices, consumer computing devices, servers, clients, digital video recorders, set-top boxes for televisions, video game consoles, or any other computing device configured to communicate via the network 110, among others. The client device 120 can be a communication device through which an end user can submit requests to classify stamps in document images, or receive stamp classification information.

The client device 120 can include a processor and a memory, e.g., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The client device 120 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the client device 120 (e.g., a built-in display, microphone, etc.) or external to the housing of the client device 120 (e.g., a monitor connected to the client device 120, a speaker connected to the client device 120, etc.). In some implementations, the client device 120 may include an electronic display, which may visually displays webpages using webpage data received from one or more content sources. The client device 120 may include one or more camera devices configured to capture and record images in the memory of the client device 120. The images captured by the one or more camera devices of the client device 120 can be transmitted to the computing device 105 for stamp or marking detection and classification.

The document data receiver 130 can receive textual data of a document and image data including a capture of the document. The textual data of a document and the image data of the document can be received, for example, in a request for document classification by one or more of the client devices 120. In some implementations, the request for classification of a document can include an image of the document, and the document data receiver 130 can retrieve the textual information of the document depicted in the image data by performing one or more image analysis techniques, such as OCR. The image analysis techniques can be used to extract text that is present on the document depicted in the image. The text information may include text that is included on the document but not included in any stamps present on the document. In some implementations, the textual information can include the text present in the document and text included one or more stamps or marks present on the document. The image data received in by document data receiver can include one or more image files depicting a document (e.g., a printed piece of paper, which may include text, images, or stamps or marks to be identified, etc.). The image files may be JPEG image files, PNG image files, GIF image files, TIFF image files, PDF files, EPS files, RAW image files, or any other type of image file or image data. In some implementations, the document data receiver 130 can include one or more camera devices capable of capturing images of printed documents. In such implementations, the document data receiver can receive the textual data of the document or the image data of the document from the one or more camera devices subsequent to capturing an image of a document. Any captured images can be stored, for example, in the memory of the computing device 105.

The image data pre-processor 135 can pre-process the image data. By pre-processing the image data, the computing device 105 can more efficiently and accurately classify one or more stamps or markings of interest in the document to be classified. Pre-processing the image data can include converting the image data to grayscale, or otherwise modifying the colors of the image data to better suit the classification models used by the computing device 105 to detect and classify one or more stamps present in the document under analysis. For at least the same reasons, the image data may be pre-processed by downscaling the image data (in grayscale, modified color, or as-is, etc.) to a predetermined size. The predetermined size may have equal height and width dimensions (e.g., 512×512, 1024×1024, 2048×2048, etc.). The downscaled image data may be cropped to remove irrelevant image data that would otherwise not contribute to the classification of any stamp or marking. For example, the image data pre-processor 135 may crop out areas of the image that do not include the document under analysis, such as the areas of the image that are outside the edges of the document.

The text data filter 140 can filter the textual data to remove predetermined characters. For example, the text data filter 140 may clean the text to remove any characters, sentences, or other information from the document text information that would otherwise interfere with the detection or classification of stamps or marks of interest in the document under analysis. Such cleaning can include, for example, identifying one or more characters (e.g., symbols, etc.), words, phrases, sentences, paragraphs, passages, or other text information that is not relevant to, or may otherwise obstruct, the detection or classification of the stamps or markings of interest, and remove (e.g., filter, etc.) it from the textual data. Filtering the textual data can include applying a regular expression filter to the textual data. Regular expressions may identify predetermined characters or sequences of characters, and can perform one or more operations (e.g., removal, etc.) on those characters. Filtering the textual data may further include standardizing at least one word of the textual data according to a predefined dictionary. Standardizing one or more words of the textual data can include replacing word present in the text data with one deemed more appropriate by the text data filter 140. For example, if a word includes a typographical error, the text data filter 140 may utilize a predefined dictionary to identify the correct spelling of the word, and replace the word with the typographical error to correct the error.

The vector converter 145 can convert the textual data to a term frequency-inverse document frequency (TF-IDF) vector. The TF-IDF vector can include a series of weight values that each correspond to the frequency or relevance of a word or term in the textual data of the document under analysis. To convert the textual data to the TF-IDF vector, the vector converter 145 can identify each individual word in the textual data, and determine the number of times that word appears in the textual data of the document under analysis. The number of times a word or term appears in the textual data of the document under analysis can be referred to as its term frequency. To determine the term frequency, the vector converter 145 can scan through every word in the textual data, and increment a counter associated with that word. If the word is not yet associated with a counter, the vector converter 145 can initialize a new counter for that word, and assign it an initialization value (e.g., one, etc.). Using the term frequency, the vector converter 145 can assign a weight value to each of the words or terms in the textual data a weight value. Each of the weight values can be assigned to a coordinate in the TF-IDF vector data structure.

The stamp detector 150 can detect, via a trained neural network from the pre-processed image data and the TF-IDF vector, a presence of a stamp on the document. Based on the text information, the stamp detector can utilize one or more natural language processing (NLP) models to determine that a document likely has a stamp or marking of interest. Certain documents, for example, may include text that indicates that the document should have one or more stamps or markings (e.g., a signature line indicating a signature may be present, a notary field indicating a notary stamp may be present, or any other type of field that might indicate a stamp or marking may have been added after printing, etc.). Other documents may include language that would otherwise not indicate that a stamp is present in the document. For example, by analyzing the text information using an NLP model, the stamp detector 150 may determine that there is no such field, signature line, or other indication present. The stamp detector 150 can further analyze the document by applying the image data of the document to one or more object detection models. The object detection models can include, for example, CNNs, DNNs, autoencoder models, fully connected neural networks, or some combination thereof. The one or more object detection models can take the image data that was pre-processed by the image data pre-processor 135 as an input. The object detection models may have an input layer (e.g., a first set of neural network nodes each associated with a weight value or a bias value, etc.) that has similar dimensions to the number of pixels in the pre-processed image data. For example, if the pre-processed image data is 512 pixels wide by 512 pixels high, the input layer for the object detection model may be a two-dimensional weight tensor of with 512 rows and 512 columns.

To detect the presence of one or more stamps in the image data, the stamp detector 150 can multiply the pixel values (e.g., the gray scale intensity of the pre-processed image data, etc.) of the pixels by the weight value tensor of the input layer. The output of the first layer of the neural network can be multiplied by a tensor representing a second layer, and so on until a number is output that represents a classification value. The weight values in each tensor representing the neural network layers can be trained such that the final layer will output an indication of whether the document under analysis includes one or more stamps or markings of interest. In some implementations, the stamp detector 150 can output the approximate location (e.g., pixel location) or boundaries (e.g., a box defining pixel coordinates of the boundaries of the detected stamp, etc.) of one or more stamps or markings of interest in the document under analysis.

Figure 2:
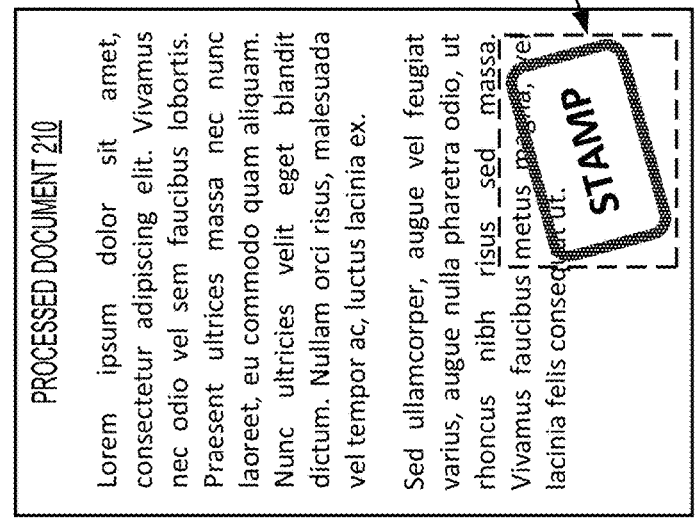
FIG. 2 shows an illustrative diagram of a document undergoing a pre-processing and stamp detection process.
Figure 2:
Figure 2:
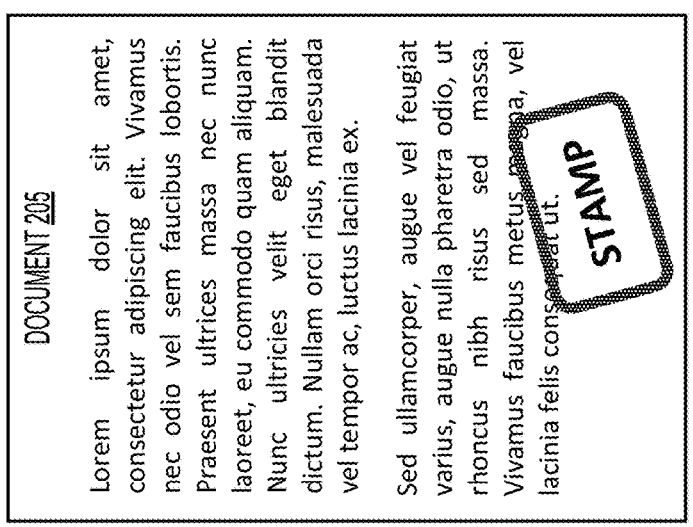

Referring briefly now to FIG. 2, depicted is an example diagram 200 showing the detection of one or more stamps in a document image 205. As shown in diagram 200, the document image data 205 includes example text and an example stamp. As described above, the computing device 105 or the components thereof can pre-process the image data and the textual data of the document 205 to create data that represents a pre-processed document 210. As shown the image data of the pre-processed document 210 includes image the stamp. After pre-processing, the stamp detector 150 has detected the presence of a stamp in the document. In this example illustration, the bounding box 215 is shown to illustrate the detection of the presence of the stamp of the document 205. In some implementations, the bounding box 215 can represent the pixel locations of the image data of the document 205 that identify a bounding box around the detected stamp. This bounding box information can be used in later processing steps to aid in the extraction and classification of the stamp or marking.

Referring back to FIG. 1, the image data extractor 155 can, responsive to detection of the presence of the stamp, extract a subset of the image data including the stamp. Once the presence of the stamp has been detected, the image data extractor 155 can identify and extract a subset of the image data that includes the stamp. This image data may also include other information, such as text that the stamp or marking of interest happens to overlap on the document under analysis. By extracting the image data that includes the stamp or mark of interest, and omitting other image data that may not be relevant to further stamp classification, the image data extractor 155 can limit and improve the performance of the classification models utilized by the computing device 105. In particular, the image data extractor 155 can reduce the amount of input data to the classification models in later pipeline stages implemented by the components of the computing device 105. In some implementations, the image data extractor 155 can utilize the bounding region identified by the stamp detector 150 to extract the subset of image data. For example, the image data extractor 155 can extract the pixels of the image data that are within the bounding region identified by the stamp detector 150 as the subset of image data that includes the detected stamp or marking of interest.

The text extractor 160 can extract, via optical character recognition (OCR), text from the subset of the image data. In addition to visual structure information defining shape, position, and size, stamps or marks of interest may include identifying text, such as identifier numbers, or other information that is relevant to the classification of a particular stamp or mark. To extract the text information from the stamp or mark of interest, the text extractor 160 can utilize OCR to identify strings of characters present in the subset of image data. In some implementations, the text extractor 160 may implement one or more neural network models to identify one or more characters or text present in the image data of the stamp. This text may not have been extracted or identified by the vector converter 145. The text extracted by the text extractor 160 may be formatted or otherwise structured based on rules for expected formats of particular text information. For example, if the text extractor 160 detects a series of digitals that have similar position information along one axis, such as the digits '1', '0', '1', '1', '9"4' in a row, the text extractor 160 may aggregate those characters into a single text string or number, such as "101194". The text extractor 160 may perform the same process with alphabetic characters that are close enough together to be considered words, phrases, or sentences.

The stamp classifier 165 can classify a stamp using a weighted ensemble model from the extracted text and the TF-IDF vector. The ensemble of models utilized by the stamp classifier 165 process both text and images to detect and classify one or more stamps or markings that may be present in document images. The combination of text and image analysis is used for classification because the stamps or markings present in document images often contain relevant identifying text in addition to identifying visual information. By synthesizing the output of text and image analysis models, the stamp classifier 160 can accurately classify and analyze the stamps or markings of interest identified by the stamp detector 150.

The image classification models of the ensemble can include CNNs, DNNs, fully connected neural networks, autoencoder networks, dense neural networks, linear regression models, rule-based techniques, and other machine learning techniques usable to identify objects in images. In some implementations, at least one image based model can include a CNN coupled with an autoencoder model with a dense neural network appended to the end. In some implementations, one other model includes a convolutional autoencoder model that can function as form of unsupervised transfer learning. The autoencoder can be fed into a dense neural network (e.g., a fully connected neural network, etc.) that acts as a classifier based on the features extracted in the autoencoder.

Language and text processing models of the ensemble can include dense neural networks, and other natural language processing models, such as LSTM or GRU based models. Both the text and the language processing and classification models can be computed by the stamp classifier 165 into a single ensemble classifier that is configured to classify stamps based on a combination of text information and image information. Weights can be applied to one or more of those models, for example through Tikhonov regularization or ridge regression, to perform weighted ensembling when creating the single ensemble classifier. The ensemble classifier can be further optimized or fit onto one or more test sets (e.g., sets of document data or set of stamps to classify) by the stamp classifier 165 using the statistical distribution of one or more test sets. Multicollinearity issues are therefore mitigated between each model by using ridge regression techniques, thus improving the efficiency in parameter estimation in used for creating a final output. The stamp classifier 165 can use cross-validation techniques to find an optimal $\lambda$ value, allowing the ensemble model to filter out any unnecessary components.

Classifying the stamp may further include classifying the stamp as corresponding to one of a predetermined plurality of classifications. For example, the stamp classifier 165 may maintain a list of predetermined classifications of stamps or markings of interest. The stamp classifier 165 can apply the text data, the TD-IDF, or the subset of the image data to one or more input layers or nodes of the ensemble model, and propagate by applying the operations (e.g., multiplication, addition, etc.) and tensor data structures specified in the model to the input values, and the output values of each sequential layer, node, or neural network structure to output a classification value for the stamp. In some implementations, the output value may be a vector of probability values, where each coordinate in the vector corresponds to one of the plurality of predetermined classifications of stamps. The stamp classifier 165 can identify the coordinate in the output vector that has the largest probability value, and use the identified coordinate to look-up (e.g., in a lookup table, etc.) the corresponding classification value for the detected stamp or marking of interest.

Figure 3:
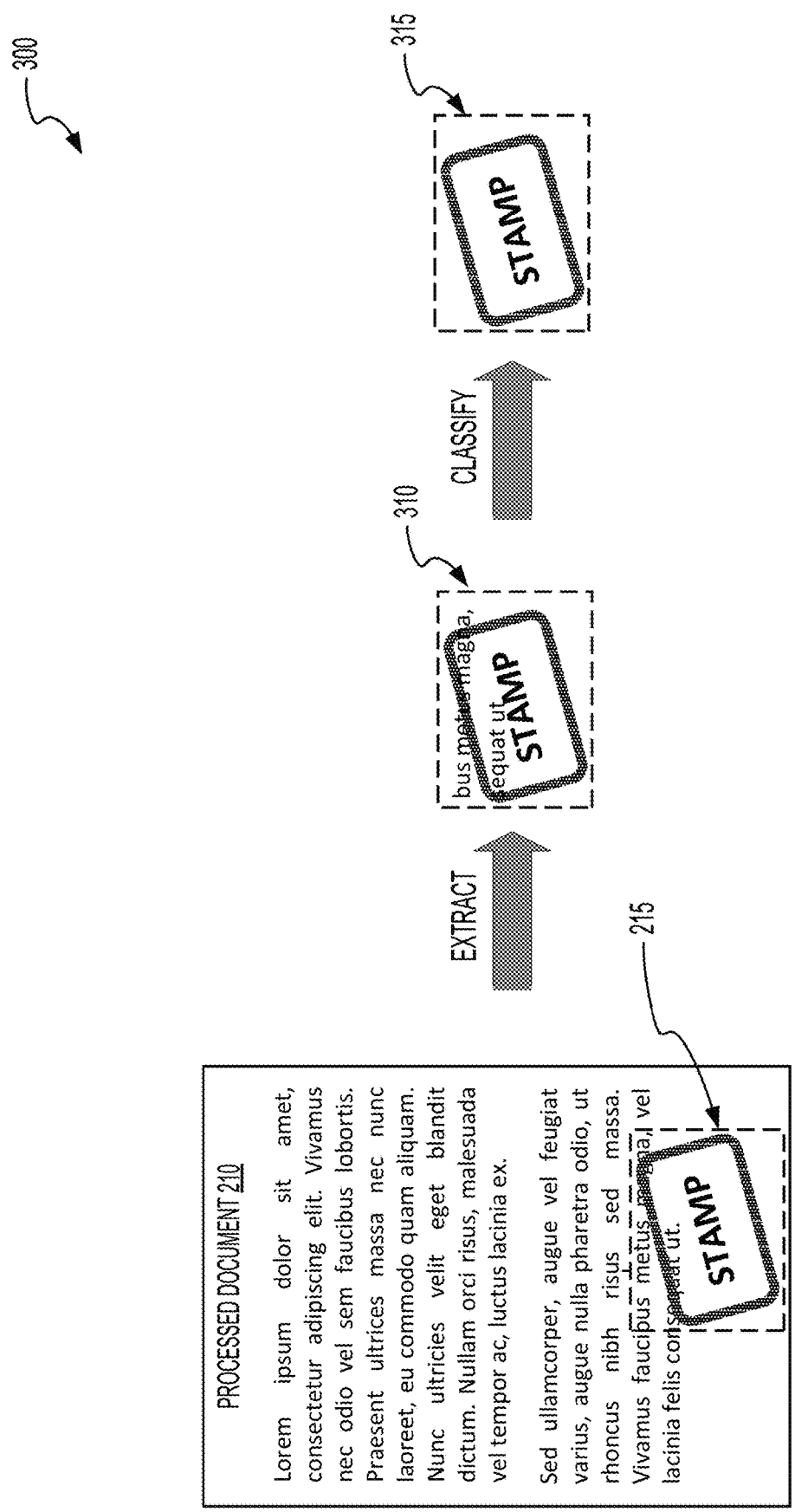
FIG. 3 shows an illustrative diagram of a document undergoing a stamp extraction and classification process.

Referring briefly now to FIG. 3, depicted is an example diagram 300 illustrating example results of the extraction and classification of one or more stamps from a processed document image 210. As shown, the processed document 210 includes a detected stamp bounding region 215. The image data extractor 155 can extract the subset of the image data 310 of the processed document 210 that includes the stamp. Then, based on the image data, and text data extracted from the subset of the image data 310, and the TF-IDF vector generated from the processed document 210, the stamp classifier 165 can classify the stamp to generate a classification value (shown in diagram 300 as a stamp 315 without any markings from the document 210).

Referring back to FIG. 1, the stamp identification manager 170 can store the subset of the image data including the stamp 175, the extracted text from the subset of the image data 180, and an identification of the classification of the stamp 185 in the database 115. For example, the stamp identification manager 170 can access the database 115 to create one or more entries that are associated with the document under analysis. Then, the stamp identification manager 170 can generate one or more data structures that each correspond to the one or more detected stamps or markings of interest in the document under analysis. The stamp identification manager 170 can then populate the data structures using the subset of the image data 175 extracted by the image data extractor 155, the extracted text 180 from the text extractor 160, and the classification of the stamp 185 received from the stamp classifier 165. In some implementations, the stamp identification manager 170 can transmit the image data 175, the extracted text 180, and the identification of the stamps 185 that correspond to the one or more stamps or markings of interest in the analyzed document to the client device 120 that requested analysis of the document. The stamp identification manager 170 can transmit the image data 175, the extracted text 180, and the identification of the stamps 185, for example, in a response message via the network 110.

Figure 4:
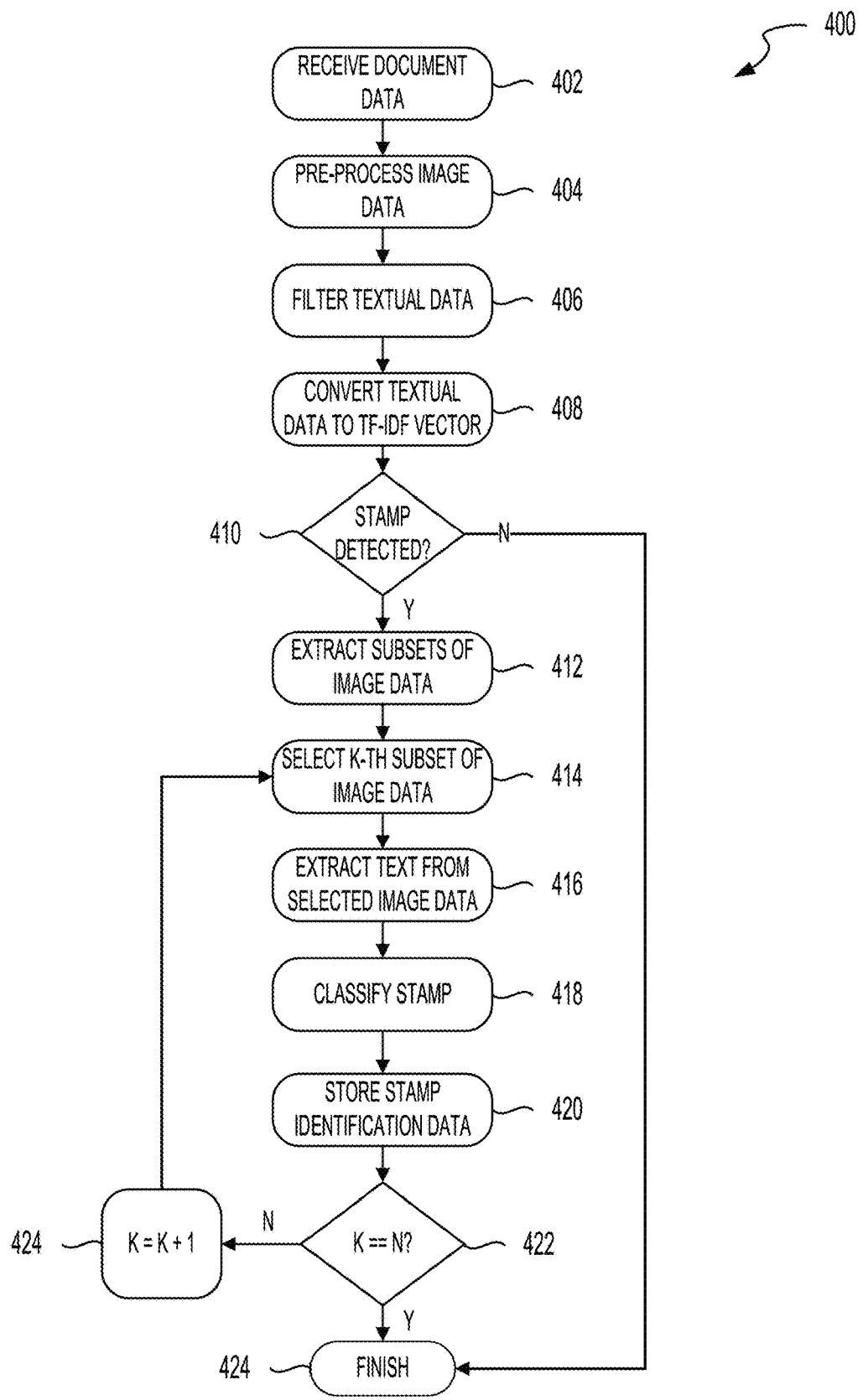
FIG. 4 shows an illustrative flow chart of an example method of detecting and classifying stamps in document images.

Referring now to FIG. 4, depicted is an illustrative flow chart of an example method 400 of detecting and classifying stamps or markings in a document, in accordance with one or more implementations. The method can be performed, for example, by the computing device 105 described herein above in conjunction with FIG. 1, or by the computing device 500 described herein below in conjunction with FIGS. 5A and 5B, or by any other computing device described herein. The computing system (e.g., the computing device 105, etc.) can receive document data (ACT 402). The computing system can pre-process image data of the document data (ACT 404). The computing system can filter the textual data of the document data (ACT 406). The computing system can convert the textual data to a TF-IDF vector (ACT 408). The computing system can determine if a stamp has been detected (DECISION 410). The computing system can extract subsets of image data (ACT 412). The computing system can select the k-th subset of image data (ACT 414). The computing system can extract text from the selected subset of image data (ACT 416). The computing system can classify the stamp or marking of interest (ACT 418). The computing system can store the classification or identification of the stamp or marking of interest (ACT 420). The computing system can determine whether the counter register k is equal to the number of detected stamps or markings of interest n (DECISION 422). The computing system can increment the counter register k (ACT 424). The computing system can finish classifying stamps or markings of interest (ACT 426).

The computing system (e.g., the computing device 105, etc.) can receive document data (ACT 402). The computing system can receive textual data of a document and image data including a capture of the document. The textual data of a document and the image data of the document can be received, for example, in a request for document classification by one or more of the client devices 120. In some implementations, the request for classification of a document can include an image of the document, and the computing system can retrieve the textual information of the document depicted in the image data by performing one or more image analysis techniques, such as OCR. The image analysis techniques can be used to extract text that is present on the document depicted in the image. The text information may include text that is included on the document but not included in any stamps present on the document. In some implementations, the textual information can include the text present in the document and text included one or more stamps or marks present on the document. The image data received in by document data receiver can include one or more image files depicting a document (e.g., a printed piece of paper, which may include text, images, or stamps or marks to be identified, etc.). The image files may be JPEG image files, PNG image files, GIF image files, TIFF image files, PDF files, EPS files, RAW image files, or any other type of image file or image data. In some implementations, the computing system can include one or more camera devices capable of capturing images of printed documents. In such implementations, the document data receiver can receive the textual data of the document or the image data of the document from the one or more camera devices subsequent to capturing an image of a document. Any captured images can be stored, for example, in the memory of the computing system.

The computing system can pre-process image data of the document data (ACT 404). By pre-processing the image data, the computing system can more efficiently and accurately classify one or more stamps or markings of interest in the document to be classified. Pre-processing the image data can include converting the image data to grayscale, or otherwise modifying the colors of the image data to better suit the classification models used by the computing system to detect and classify one or more stamps present in the document under analysis. For at least the same reasons, the image data may be pre-processed by downscaling the image data (in grayscale, modified color, or as-is, etc.) to a predetermined size. The predetermined size may have equal height and width dimensions (e.g., 512×512, 1024×1024, 2048×2048, etc.). The downscaled image data may be cropped to remove irrelevant image data that would otherwise not contribute to the classification of any stamp or marking. For example, the computing system may crop out areas of the image that do not include the document under analysis, such as the areas of the image that are outside the edges of the document.

The computing system can filter the textual data of the document data (ACT 406). For example, the computing system may clean the text to remove any characters, sentences, or other information from the document text information that would otherwise interfere with the detection or classification of stamps or marks of interest in the document under analysis. Such cleaning can include, for example, identifying one or more characters (e.g., symbols, etc.), words, phrases, sentences, paragraphs, passages, or other text information that is not relevant to, or may otherwise obstruct, the detection or classification of the stamps or markings of interest, and remove (e.g., filter, etc.) it from the textual data. Filtering the textual data can include applying a regular expression filter to the textual data. Regular expressions may identify predetermined characters or sequences of characters, and can perform one or more operations (e.g., removal, etc.) on those characters. Filtering the textual data may further include standardizing at least one word of the textual data according to a predefined dictionary. Standardizing one or more words of the textual data can include replacing word present in the text data with one deemed more appropriate by the computing system. For example, if a word includes a typographical error, the computing system may utilize a predefined dictionary to identify the correct spelling of the word, and replace the word with the typographical error to correct the error.

The computing system can convert the textual data to a TF-IDF vector (ACT 408). The computing system can convert the textual data to a term frequency-inverse document frequency (TF-IDF) vector. The TF-IDF vector can include a series of weight values that each correspond to the frequency or relevance of a word or term in the textual data of the document under analysis. To convert the textual data to the TF-IDF vector, the computing system can identify each individual word in the textual data, and determine the number of times that word appears in the textual data of the document under analysis. The number of times a word or term appears in the textual data of the document under analysis can be referred to as its term frequency. To determine the term frequency, the computing system can scan through every word in the textual data, and increment a counter associated with that word. If the word is not yet associated with a counter, the computing system can initialize a new counter for that word, and assign it an initialization value (e.g., one, etc.). Using the term frequency, the vector converter 145 can assign a weight value to each of the words or terms in the textual data a weight value. Each of the weight values can be assigned to a coordinate in the TF-IDF vector data structure.

The computing system can determine if a stamp has been detected (DECISION 410). The computing system can detect, via a trained neural network from the pre-processed image data and the TF-IDF vector, a presence of a stamp on the document. Based on the text information, the stamp detector can utilize one or more natural language processing (NLP) models to determine that a document likely has a stamp or marking of interest. Certain documents, for example, may include text that indicates that the document should have one or more stamps or markings (e.g., a signature line indicating a signature may be present, a notary field indicating a notary stamp may be present, or any other type of field that might indicate a stamp or marking may have been added after printing, etc.). Other documents may include language that would otherwise not indicate that a stamp is present in the document. For example, by analyzing the text information using an NLP model, the computing system may determine that there is no such field, signature line, or other indication present. The computing system can further analyze the document by applying the image data of the document to one or more object detection models. The object detection models can include, for example, CNNs, DNNs, autoencoder models, fully connected neural networks, or some combination thereof. The one or more object detection models can take the image data that was pre-processed by the computing system as an input. The object detection models may have an input layer (e.g., a first set of neural network nodes each associated with a weight value or a bias value, etc.) that has similar dimensions to the number of pixels in the pre-processed image data. For example, if the pre-processed image data is 512 pixels wide by 512 pixels high, the input layer for the object detection model may be a two-dimensional weight tensor of with 512 rows and 512 columns.

To detect the presence of one or more stamps in the image data, the computing system can multiply the pixel values (e.g., the gray scale intensity of the pre-processed image data, etc.) of the pixels by the weight value tensor of the input layer. The output of the first layer of the neural network can be multiplied by a tensor representing a second layer, and so on until a number is output that represents a classification value. The weight values in each tensor representing the neural network layers can be trained such that the final layer will output an indication of whether the document under analysis includes one or more stamps or markings of interest. In some implementations, the computing system can output the approximate location (e.g., pixel location) or boundaries (e.g., a box defining pixel coordinates of the boundaries of the detected stamp, etc.) of one or more stamps or markings of interest in the document under analysis. If the computing system detects the presence of one or more stamps or markings of interest, the computing system can perform ACT 412 of the method 400. Otherwise, the computing system can perform ACT 426 of the method 400.

The computing system can extract subsets of image data (ACT 412). The computing system can, responsive to detection of the presence of the stamp, extract a subset of the image data including the stamp or markings of interest. Once the presence of the stamp has been detected, the computing system can identify and extract a subset of the image data that includes the stamp. This image data may also include other information, such as text that the stamp or marking of interest happens to overlap on the document under analysis. By extracting the image data that includes the stamp or mark of interest, and omitting other image data that may not be relevant to further stamp classification, the computing system can limit and improve the performance of the classification models utilized by the computing system. In particular, the computing system can reduce the amount of input data to the classification models in later classification pipeline stages. In some implementations, the computing system can utilize the previously identified bounding region to extract the subset of image data. For example, the computing system can extract the pixels of the image data that are within the bounding region as the subset of image data that includes the detected stamp or marking of interest The computing system can select the k-th subset of image data (ACT 414). To extract each of the stamps or marks of interest present in the document under analysis, the computing system can iteratively loop through each of the detected stamps or markings of interest based on a counter register k. Each of the stamps or markings of interest can be indexed by an index value (e.g., index 0, index 1, index 2, etc.). The computing system can select the stamp or marking of interest that is associated with an index value equal to the counter register k. If it is the first iteration of the loop, the counter register k may be initialized to an initialization value (e.g. k=0) before selecting the k-th classifier.

The computing system can extract text from the selected subset of image data (ACT 416). The computing system can extract, via optical character recognition (OCR), text from the selected subset of the image data. In addition to visual structure information defining shape, position, and size, stamps or marks of interest may include identifying text, such as identifier numbers, or other information that is relevant to the classification of a particular stamp or mark. To extract the text information from the selected stamp or mark of interest, the computing system can utilize OCR to identify strings of characters present in the subset of image data. In some implementations, the computing system may implement one or more neural network models to identify one or more characters or text present in the image data of the stamp. The text extracted by the computing system may be formatted or otherwise structured based on rules for expected formats of particular text information. For example, if the computing system detects a series of digitals that have similar position information along one axis, such as the digits '1', '0', '1', '7', '9' '3' in a row, the computing system may aggregate those characters into a single text string or number, such as "101793". The computing system may perform the same process with alphabetic characters that are close enough together to be considered words, phrases, or sentences.

The computing system can classify the stamp or marking of interest (ACT 418). The computing system can classify the selected stamp using a weighted ensemble model from the extracted text and the TF-IDF vector. The ensemble of models utilized by the computing system process both text and images to detect and classify the selected stamp or marking present in the document image. The combination of text and image analysis is used for classification because the stamps or markings present in document images often contain relevant identifying text in addition to identifying visual information. By synthesizing the output of text and image analysis models, the computing system can accurately classify and analyze the selected stamp or marking of interest.

The image classification models of the ensemble can include CNNs, DNNs, fully connected neural networks, autoencoder networks, dense neural networks, linear regression models, rule-based techniques, and other machine learning techniques usable to identify objects in images. In some implementations, at least one image based model can include a CNN coupled with an autoencoder model with a dense neural network appended to the end. In some implementations, one other model includes a convolutional autoencoder model that can function as form of unsupervised transfer learning. The autoencoder can be fed into a dense neural network (e.g., a fully connected neural network, etc.) that acts as a classifier based on the features extracted in the autoencoder.

Language and text processing models of the ensemble can include dense neural networks, and other natural language processing models, such as LSTM or GRU based models. Both the text and the language processing and classification models can be computed by the computing system into a single ensemble classifier that is configured to classify stamps based on a combination of text information and image information. Weights can be applied to one or more of those models, for example through Tikhonov regularization or ridge regression, to perform weighted ensembling when creating the single ensemble classifier. The ensemble classifier can be further optimized or fit onto one or more test sets (e.g., sets of document data or set of stamps to classify) by the computing system using the statistical distribution of one or more test sets. Multicollinearity issues are therefore mitigated between each model by using ridge regression techniques, thus improving the efficiency in parameter estimation in used for creating a final output. The computing system can use cross-validation techniques to find an optimal λ value, allowing the ensemble model to filter out any unnecessary components.

Classifying the stamp may further include classifying the stamp as corresponding to one of a predetermined plurality of classifications. For example, the computing system may maintain a list of predetermined classifications of stamps or markings of interest. The computing system can apply the text data, the TD-IDF, or the subset of the image data to one or more input layers or nodes of the ensemble model, and propagate by applying the operations (e.g., multiplication, addition, etc.) and tensor data structures specified in the model to the input values, and the output values of each sequential layer, node, or neural network structure to output a classification value for the stamp. In some implementations, the output value may be a vector of probability values, where each coordinate in the vector corresponds to one of the plurality of predetermined classifications of stamps. The computing system can identify the coordinate in the output vector that has the largest probability value, and use the identified coordinate to look-up (e.g., in a lookup table, etc.) the corresponding classification value for the detected stamp or marking of interest.

The computing system can store the classification or identification of the stamp or marking of interest (ACT 420). The computing system can store the subset of the image data including the stamp, the extracted text from the subset of the image data, and an identification of the classification of the stamp in a database (e.g., the database 115). For example, the computing system can access the database to create one or more entries that are associated with the document under analysis. Then, the computing system can generate a data structure that corresponds to the selected stamp or marking of interest in the document under analysis. The computing system can then populate the data structure using the subset of the image data, the extracted text, and the classification of the stamp. In some implementations, the computing system can transmit the image data, the extracted text, and the identification of the stamps that correspond to the one or more stamps or markings of interest in the analyzed document to the client device that requested analysis of the document. The computing system can transmit the image data, the extracted text, and the identification of the stamp, for example, in a response message via a network (e.g., network 110).

The computing system can determine whether the counter register k is equal to the number of detected stamps or markings of interest n (DECISION 422). To determine whether the computing system has extracted and classified each of the detected stamps or markings of interest, the computing system can compare the counter register used to select each stamp to the total number of stamps n. If the counter register k is not equal to (e.g., less than) the total number of stamps n, the computing system can execute (ACT 424). If the counter register k is equal to (e.g., equal to or greater than) the total number of stamps n, the computing system can execute (ACT 426)

The computing system can increment the counter register k (ACT 424). To extract and classify each of the detected stamps or markings of interest, the computing system can add one to the counter register k to indicate the number of stamps that have been classified. In some implementations, the computing system can set the counter register k to a memory address value (e.g., location in computer memory) of the next location in memory of the next unclassified stamp, for example in a data structure. If this is the first iteration of this loop, the computing system can initialize the counter register k to an initial value, for example zero, before incrementing the counter register. After incrementing the value of the counter register k, the computing system can execute (ACT 414) of the method 400.

The computing system can finish classifying stamps or markings of interest (ACT 426). Finish classifying the stamps or markings of interest can include de-initializing or de-allocating any temporary memory values utilized in the execution of the method 400. For example, the counter register k may be reinitialized to zero, and any temporary data structures generated by the computing system to perform any of the functionalities described herein can be de-allocated or deleted.

Accordingly, the systems and methods of this technical solution provide a combined approach to classifying both document text and image data. The systems and methods described herein present a technical improvement to document, marking, and stamp classification systems by improving the accuracy of document and stamp classification. The systems and methods described herein can implement cloud computing, machine learning, and domain-specific data processing techniques to effectively extract and classify stamps in document images that other systems cannot. The techniques described herein can pre-process and filter un-necessary data from a document image, and utilize combined outputs of image data and text data analysis techniques to detect and extract stamps or other markings from document images.

At least one aspect of this technical solution is generally directed to a method for stamp detection and classification. The method may include receiving, by a computing device, textual data of a document and image data including a capture of the document. The method may include preprocessing, by the computing device, the image data. The method may include filtering, by the computing device, the textual data to remove predetermined characters. The method may include converting, by the computing device, the textual data to a term frequency-inverse document frequency (TF-IDF) vector. The method may include detecting, by the computing device via a trained neural network from the pre-processed image data and the TF-IDF vector, a presence of a stamp on the document. The method may include, responsive to detection of the presence of the stamp, extracting, by the computing device, a subset of the image data including the stamp. The method may include extracting, by the computing device via optical character recognition, text from the subset of the image data. The method may include classifying, by the computing device via a weighted ensemble model from the extracted text and the TF-IDF vector, the stamp. The method may include storing, by the computing device in a database, the subset of the image data including the stamp, the extracted text from the subset of the image data, and an identification of the classification of the stamp.

In some implementations of the method, preprocessing the image data may include converting, by the computing device, the image data to grayscale. In some implementations of the method, preprocessing the image data may include downscaling, by the computing device, the grayscale image data to a predetermined size. In some implementations of the method, filtering the textual data may further include applying a regular expression filter to the textual data.

In some implementations of the method, filtering the textual data may further include standardizing, by the computing device, at least one word of the textual data according to a predefined dictionary. In some implementations of the method, classifying the stamp may further include applying a ridge regression model to the extracted text and the TF-IDF vector. In some implementations of the method, classifying the stamp may further include classifying the stamp as corresponding to one of a predetermined plurality of classifications.

At least one other aspect of this technical solution is generally directed to a system for stamp detection and classification. The system can include a computing device comprising one or more processors and a memory, and can be configured by machine-readable instructions. The system can receive, by a computing device, textual data of a document and image data including a capture of the document. The system can preprocess, by the computing device, the image data. The system can filter, by the computing device, the textual data to remove predetermined characters. The system can convert, by the computing device, the textual data to a term frequency-inverse document frequency vector. The system can detect, by the computing device via a trained neural network from the pre-processed image data and the TF-IDF vector, a presence of a stamp on the document. The processor(s) may be configured to, responsive to detection of the presence of the stamp, extract, by the computing device, a subset of the image data including the stamp. The system can extract, by the computing device via optical character recognition, text from the subset of the image data. The system can classify, by the computing device via a weighted ensemble model from the extracted text and the TF-IDF vector, the stamp. The system can store, by the computing device in a database, the subset of the image data including the stamp, the extracted text from the subset of the image data, and an identification of the classification of the stamp.

In some implementations, the system can pre-process the image data by converting the image data to grayscale. In some implementations, the system can pre-process the image data by downscaling the grayscale image data to a predetermined size. In some implementations, the system can filter the textual data by applying a regular expression filter to the textual data.

In some implementations, the system can filter the textual data by standardizing at least one word of the textual data according to a predefined dictionary. In some implementations, the system can classify the stamp by applying a ridge regression model to the extracted text and the TF-IDF vector. In some implementations, the system can classify the stamp by classifying the stamp as corresponding to one of a predetermined plurality of classifications.

At least one other aspect of this technical solution is generally directed to a non-transient computer-readable storage medium having instructions embodied thereon, the instructions being executable by one or more processors to perform a method for stamp detection and classification. The method may include receiving, textual data of a document and image data including a capture of the document. The method may include preprocessing, the image data. The method may include filtering, the textual data to remove predetermined characters. The method may include converting, the textual data to a term frequency-inverse document frequency vector. The method may include detecting, via a trained neural network from the pre-processed image data and the TF-IDF vector, a presence of a stamp on the document. The method may include, responsive to detection of the presence of the stamp, extracting a subset of the image data including the stamp. The method may include extracting via optical character recognition, text from the subset of the image data. The method may include classifying, via a weighted ensemble model from the extracted text and the TF-IDF vector, the stamp. The method may include storing, in a database, the subset of the image data including the stamp, the extracted text from the subset of the image data, and an identification of the classification of the stamp.

In some implementations of the method, preprocessing the image data may include converting the image data to grayscale. In some implementations of the method, preprocessing the image data may include downscaling the grayscale image data to a predetermined size. In some implementations of the method, filtering the textual data may further include applying a regular expression filter to the textual data.

In some implementations of the method, filtering the textual data may further include standardizing, at least one word of the textual data according to a predefined dictionary. In some implementations of the method, classifying the stamp may further include applying a ridge regression model to the extracted text and the TF-IDF vector. In some implementations of the method, classifying the stamp may further include classifying the stamp as corresponding to one of a predetermined plurality of classifications.

B. Computing Environment

Having discussed specific embodiments of the present solution, it may be helpful to describe aspects of the operating environment as well as associated system components (e.g., hardware elements) in connection with the methods and systems described herein.

Figure 5A:
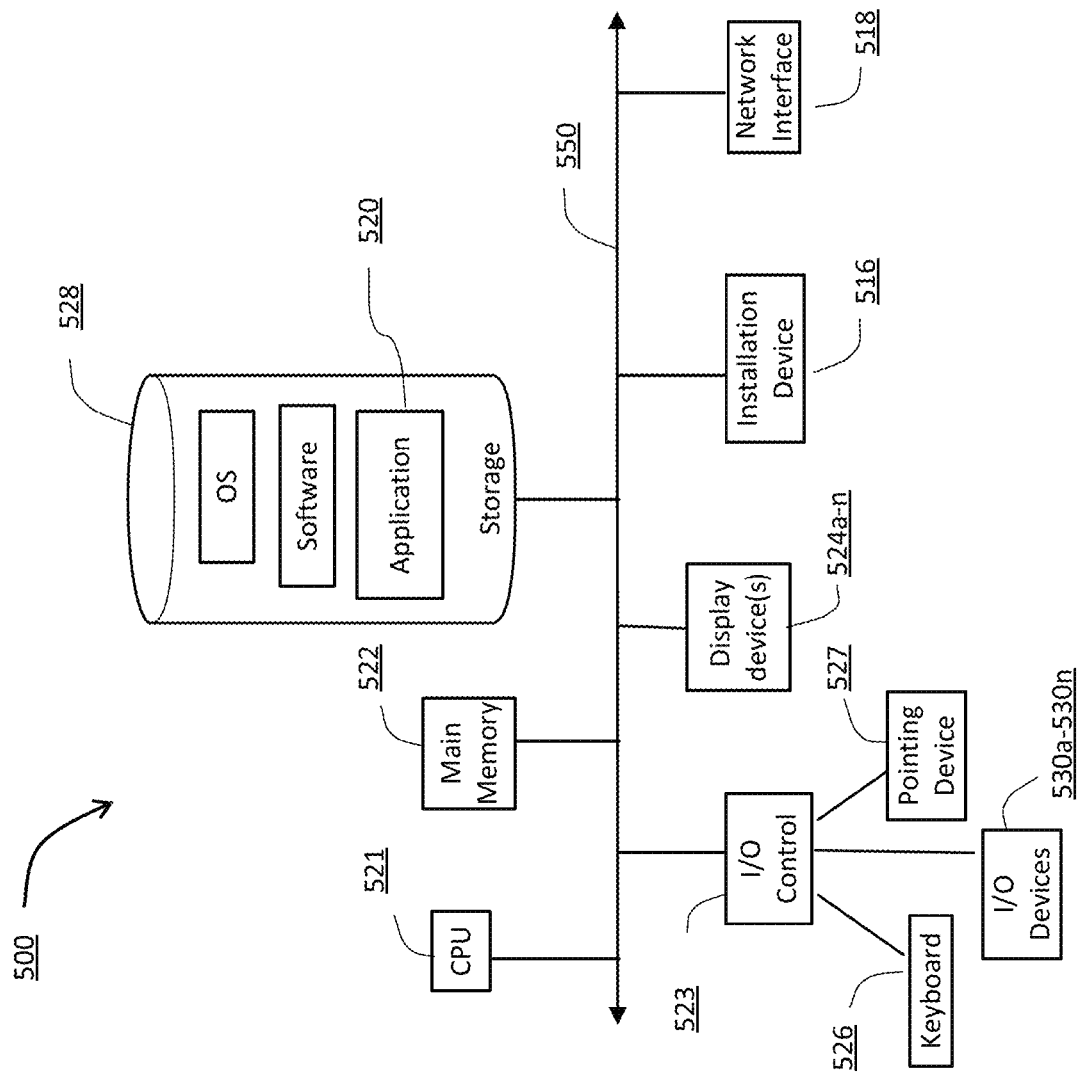
FIGS. 5A and 5B are block diagrams depicting embodiments of computing devices useful in connection with the methods and systems described herein.
Figure 5B:
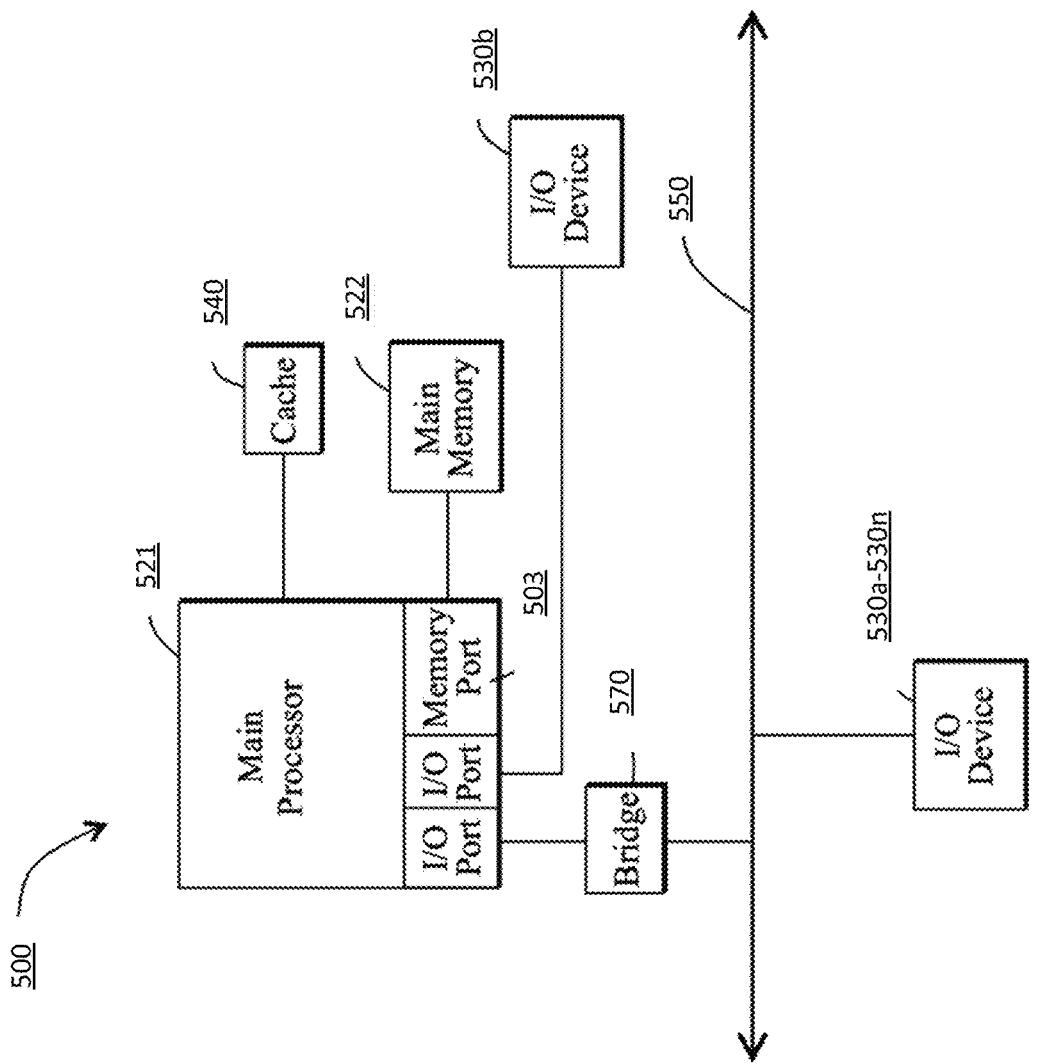

The systems discussed herein may be deployed as and/or executed on any type and form of computing device, such as a computer, network device or appliance capable of communicating on any type and form of network and performing the operations described herein. FIGS. 5A and 5B depict block diagrams of a computing device 500 useful for practicing an embodiment of the wireless communication devices 502 or the access point 506. As shown in FIGS. 5A and 5B, each computing device 500 includes a central processing unit 521, and a main memory unit 522. As shown in FIG. 5A, a computing device 500 may include a storage device 528, an installation device 516, a network interface 518, an I/O controller 523, display devices 524a-524n, a keyboard 526 and a pointing device 527, such as a mouse. The storage device 528 may include, without limitation, an operating system and/or software. As shown in FIG. 5B, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 500 may be based on any of these processors, or any other processor capable of operating as described herein. Although referred to as a central processing unit or CPU, in many implementations, the processing unit may comprise a graphics processing unit or GPU (which may be useful not just for graphics processing, but for the types of parallel calculations frequently required for neural networks or other machine learning systems), a tensor processing unit or TPU (which may comprise a machine learning accelerating application-specific integrated circuit (ASIC), or other such processing units. In many implementations, a system may comprise a plurality of processing devices of different types (e.g. one or more CPUs, one or more GPUs, and/or one or more TPUs). Processing devices may also be virtual processors (e.g. vCPUs) provided by a virtual machine managed by a hypervisor of a physical computing device and deployed as a service or cloud or in similar architectures.

Main memory unit 522 may be one or more memory chips capable of storing data and allowing any storage location to be directly accessed by the microprocessor 521, such as any type or variant of Static random access memory (SRAM), Dynamic random access memory (DRAM), Ferroelectric RAM (FRAM), NAND Flash, NOR Flash and Solid State Drives (SSD). The main memory 522 may be based on any of the above described memory chips, or any other available memory chips capable of operating as described herein. In the embodiment shown in FIG. 5A, the processor 521 communicates with main memory 522 via a system bus 550 (described in more detail below). FIG. 5B depicts an embodiment of a computing device 500 in which the processor communicates directly with main memory 522 via a memory port 503. For example, in FIG. 5B the main memory 522 may be DRDRAM.

FIG. 5B depicts an embodiment in which the main processor 521 communicates directly with cache memory 540 via a secondary bus, sometimes referred to as a backside bus. In other embodiments, the main processor 521 communicates with cache memory 540 using the system bus 550. Cache memory 540 typically has a faster response time than main memory 522 and is provided by, for example, SRAM, BSRAM, or EDRAM. In the embodiment shown in FIG. 5B, the processor 521 communicates with various I/O devices 530 via a local system bus 550. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5B depicts an embodiment of a computer 500 in which the main processor 521 may communicate directly with I/O device 530b, for example via HYPERTRANSPORT, RAPIDIO, or INFINIBAND communications technology. FIG. 5B also depicts an embodiment in which local busses and direct communication are mixed: the processor 521 communicates with I/O device 530a using a local interconnect bus while communicating with I/O device 530b directly.

A wide variety of I/O devices 530a-530n may be present in the computing device 500. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 523 as shown in FIG. 5A. The I/O controller may control one or more I/O devices such as a keyboard 526 and a pointing device 527, e.g., a mouse or optical pen. Furthermore, an I/O device may also provide storage and/or an installation medium 516 for the computing device 500. In still other embodiments, the computing device 500 may provide USB connections (not shown) to receive handheld USB storage devices such as the USB Flash Drive line of devices manufactured by Twintech Industry, Inc. of Los Alamitos, Calif.

Referring again to FIG. 5A, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 504 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some embodiments, the computing device 500 may include or be connected to one or more display devices 524a-524n. As such, any of the I/O devices 530a-530n and/or the I/O controller 523 may include any type and/or form of suitable hardware, software, or combination of hardware and software to support, enable or provide for the connection and use of the display device(s) 524a-524n by the computing device 500. For example, the computing device 500 may include any type and/or form of video adapter, video card, driver, and/or library to interface, communicate, connect or otherwise use the display device(s) 524a-524n. In one embodiment, a video adapter may include multiple connectors to interface to the display device(s) 524a-524n. In other embodiments, the computing device 500 may include multiple video adapters, with each video adapter connected to the display device(s) 524a-524n. In some embodiments, any portion of the operating system of the computing device 500 may be configured for using multiple displays 524a-524n. One ordinarily skilled in the art will recognize and appreciate the various ways and embodiments that a computing device 500 may be configured to have one or more display devices 524a-524n.

In further embodiments, an I/O device 530 may be a bridge between the system bus 550 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 500 of the sort depicted in FIGS. 5A and 5B may operate under the control of an operating system, which control scheduling of tasks and access to system resources. The computing device 500 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 500 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 500 has sufficient processor power and memory capacity to perform the operations described herein.

In some embodiments, the computing device 500 may have different processors, operating systems, and input devices consistent with the device. For example, in one embodiment, the computing device 500 is a smart phone, mobile device, tablet or personal digital assistant. In still other embodiments, the computing device 500 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some implementations, software functionality or executable logic for execution by one or more processors of the system may be provided in any suitable format. For example, in some implementations, logic instructions may be provided as native executable code, as instructions for a compiler of the system, or in a package or container for deployment on a virtual computing system (e.g. a Docker container, a Kubernetes Engine (GKE) container, or any other type of deployable code). Containers may comprise standalone packages comprising all of the executable code necessary to run an application, including code for the application itself, code for system tools or libraries, preferences, settings, assets or resources, or other features. In many implementations, containers may be platform or operating system agnostic. In some implementations, a docker engine executed by a single host operating system and underlying hardware may execute a plurality of containerized applications, reducing resources necessary to provide the applications relative to virtual machines for each application (each of which may require a guest operating system). Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for stamp detection and classification, comprising:
   receiving, by a computing device, textual data of a document and image data comprising a capture of the document;
   detecting, by the computing device via a trained neural network from the textual data and image data, a presence of a stamp on the document, wherein the trained neural network comprises a weighted ensemble model;
   responsive to detection of the presence of the stamp, extracting, by the computing device, a subset of the image data comprising the stamp;
   extracting, by the computing device via optical character recognition, text from the subset of the image data; and
   storing, by the computing device in a database, the subset of the image data comprising the stamp, the extracted text from the subset of the image data, and an identification of a classification of the stamp.

2. The method of claim 1, further comprising converting, by the computing device, the image data to grayscale.

3. The method of claim 1, further comprising downscaling, by the computing device, the grayscale image data to a predetermined size.

4. The method of claim 1, further comprising:
   filtering, by the computing device, the textual data to remove predetermined characters; and
   converting, by the computing device, the textual data to a term frequency-inverse document frequency (TF-IDF) vector.

5. The method of claim 4, wherein filtering the textual data further comprises applying a regular expression filter to the textual data.

6. The method of claim 4, wherein filtering the textual data further comprises standardizing, by the computing device, at least one word of the textual data according to a predefined dictionary.

7. The method of claim 4, wherein the TF-IDF vector is used as an input to the trained neural network.

8. The method of claim 1, further comprising classifying the stamp as corresponding to one of a predetermined plurality of classifications.

9. A method for stamp detection and classification, comprising:
   receiving, by a computing device, textual data of a document and image data comprising a capture of the document;
   detecting, by the computing device via a trained neural network from the textual data and image data, a presence of a stamp on the document;
   responsive to detection of the presence of the stamp, extracting, by the computing device, a subset of the image data comprising the stamp;
   extracting, by the computing device via optical character recognition, text from the subset of the image data;
   classifying the stamp according to a ridge regression model; and
   storing, by the computing device in a database, the subset of the image data comprising the stamp, the extracted text from the subset of the image data, and an identification of the classification of the stamp.

10. A system configured for stamp detection and classification, the system comprising:
    a computing device comprising one or more processors and a memory, configured to:
    receive textual data of a document and image data comprising a capture of the document,
    detect, via a trained neural network from the textual data and image data, a presence of a stamp on the document, wherein the trained neural network comprises a weighted ensemble model,
    responsive to detection of the presence of the stamp, extract a subset of the image data comprising the stamp,
    extract, via optical character recognition, text from the subset of the image data, and
    store, in a database, the subset of the image data comprising the stamp, the extracted text from the subset of the image data, and an identification of a classification of the stamp.

11. The system of claim 10, wherein the computing device is further configured to convert the image data to grayscale.

12. The system of claim 10, wherein the computing device is further configured to downscale the grayscale image data to a predetermined size.

13. The system of claim 10, wherein the computing device is further configured to:

filtering the textual data to remove predetermined characters; and convert the textual data to a term frequency-inverse document frequency (TF-IDF) vector.

14. The system of claim 13, wherein the computing device is further configured to apply a regular expression filter to the textual data.

15. The system of claim 13, wherein the computing device is further configured to standardize at least one word of the textual data according to a predefined dictionary.

16. The system of claim 13, wherein the TF-IDF vector is used as an input to the trained neural network.

17. The system of claim 10, wherein the computing device is further configured to classify the stamp as corresponding to one of a predetermined plurality of classifications.

18. A system configured for stamp detection and classification, the system comprising:

a computing device comprising one or more processors and a memory, configured to:

receive textual data of a document and image data comprising a capture of the document, detect, via a trained neural network from the textual data and image data, a presence of a stamp on the document, responsive to detection of the presence of the stamp, extract a subset of the image data comprising the stamp, extract, via optical character recognition, text from the subset of the image data, classify the stamp according to a ridge regression model, and store, in a database, the subset of the image data comprising the stamp, the extracted text from the subset of the image data, and an identification of the classification of the stamp.

* * * * *